United States Patent
Christensen et al.

(10) Patent No.: US 9,253,310 B2
(45) Date of Patent: Feb. 2, 2016

(54) OUTBOUND EFFECTIVENESS THROUGH MANAGEMENT OF IDLE AGENT POOL

(75) Inventors: Tore Christensen, Boulder, CO (US); Alan David Eicholz, Sammimish, WA (US); Andrew D. Flockhart, Thornton, CO (US); Katherine Anthony Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/396,419

(22) Filed: Feb. 14, 2012

(65) Prior Publication Data
US 2013/0208883 A1 Aug. 15, 2013

(51) Int. Cl.
*H04M 3/00* (2006.01)
(52) U.S. Cl.
CPC ....................................... *H04M 3/00* (2013.01)
(58) Field of Classification Search
USPC ........................................... 379/265, 265.01
See application file for complete search history.

(56) References Cited

U.S. PATENT DOCUMENTS

| | | | | |
|---|---|---|---|---|
| 5,214,688 | A * | 5/1993 | Szlam | H04M 3/36 379/111 |
| 7,035,927 | B2 * | 4/2006 | Flockhart | H04M 3/5158 379/265.01 |
| 2010/0235218 | A1 | 9/2010 | Erhart et al. | |
| 2010/0296417 | A1 | 11/2010 | Steiner | |
| 2010/0296646 | A1 | 11/2010 | Hemm et al. | |
| 2011/0125793 | A1 | 5/2011 | Erhart et al. | |
| 2011/0125826 | A1 | 5/2011 | Erhart et al. | |
| 2011/0255683 | A1 | 10/2011 | Flockhart et al. | |

* cited by examiner

*Primary Examiner* — Amal Zenati
(74) *Attorney, Agent, or Firm* — Sheridan Ross P.C.

(57) ABSTRACT

A contact center is described along with various methods and mechanisms for administering the same. The contact center proposed herein provides the ability to, among other things, establish and maintain a pool of idle agents so that when an outbound call attempt is successful, the agent which is assigned to the successful outbound call attempt can be selected from a plurality of agents based on the agent's superior efficiency rather than being based on the fact that the agent is the next in line to be assigned to such a contact.

26 Claims, 6 Drawing Sheets

OUTBOUND EFFECTIVENESS THROUGH MANAGEMENT OF IDLE AGENT POOL

FIELD OF THE DISCLOSURE

The present disclosure is generally directed toward communications and more specifically toward contact centers.

BACKGROUND

In traditional contact centers, all agents in an outbound calling campaign are generally considered the same and will be delivered the next outbound call attempt which is successfully answered by a customer in the order that the agents becomes available. In more sophisticated contact centers, the agents may be ranked for outbound calls by skill level and/or idle time. This approach, however, does not optimize the matching of the skills and abilities of the agent with the unique needs of the person being called and, therefore, only achieves average results.

Meanwhile, outbound dialers are currently optimized to minimize idle time and outbound dialers are paced in order to attempt to perfectly synchronize the answering of outbound call attempts with the availability of agents to service those calls. Additional details of a contact center employing such a pacing function is described in U.S. Pat. No. 7,035,927 to Flockhart et al., the entire contents of which are hereby incorporated herein by reference.

Existing outbound solutions are optimized for efficiency, but not for effectiveness or matching the compatibility of agent and customer. Existing outbound solutions also do not attempt to match dialed customers (e.g., customers of outbound contacts) with agents who are the best available to deal with the specific needs of the dialed customer.

SUMMARY

It is, therefore, one aspect of the present disclosure to provide an outbound dialer that can improve the quality of service, effectiveness of service, and efficiency of service, by placing less emphasis on timing (e.g., minimizing agent idle time) and more emphasis on achieving a better quality match of needs of the customer and skills and abilities of the agent.

In particular, embodiments of the present disclosure have recognized that, in some instances, it is better to let agents sit idle for an amount of time so that better matches between agents and dialed customers can be achieved. As a non-limiting example, agents may be allowed or even forced to set idle for an average of X seconds (e.g., 5 seconds, 10 seconds, 30 seconds, etc.) if by doing so a better match between customer and agent can be achieved. Enhancing the number of well-matched agents and dialed customers may, over the long-run, reduce call handling times by an average of Y seconds, where Y is greater than X (e.g., 10 seconds, 15 seconds, 45 seconds, etc.). This results in a global gain in efficiency for the contact center as well as better agent-to-customer matches, which is likely to increase customer satisfaction and contact center production.

There may be many ways to create and intelligently manage the size of the pool of idle agents. In some embodiments, agents may be forced to be idle for a predetermined amount of time and that predetermined amount of time may be controlled or dynamically varied depending upon certain conditions within the contact center (e.g., success rate for outbound attempts, current inbound workflow volume, etc.). In some embodiments, the pacing algorithm of the outbound dialer is adjusted and the rate at which outbound calls are made can be slowed, thereby creating a small pool of available agents who are capable of servicing the connected outbound calls.

In some embodiments, when an outbound attempt succeeds, a rules-based matching system is used to match the customer's specific needs and preferences, which are also known as skill requirements, with the most compatible agent from the available agent pool. This increases the match efficiency between the agents and outbound contacts, which may result in an overall efficiency gain for the contact center. Referring to the example above, allowing agents to wait for 10 seconds may achieve efficiency gains of 15 seconds because a more efficient agent is selected for the outbound contact. The idea of having agents sit in an idle agent pool to increase overall contact center performance is counter-intuitive, but likely to achieve gains in efficiency.

Embodiments of the present invention may further optimize the effectiveness of the contact center by employing a genetic pacing algorithm. For instance, the pacing algorithm may be adjusted by a small amount randomly at regular intervals. These adjustments can increase or decrease the number of agents in the idle agent pool. If the change produces superior results (e.g., efficiencies increase, profits/call increase, etc.), the change is accepted and the new operating parameters for the pacing algorithm are used for a period of time. If the change produces inferior results, the change is reversed. Over time, this pacing algorithm will evolve to the most efficient solution for current conditions. As conditions change, the pacing algorithm will automatically evolve to the new most efficient rate for those conditions.

Embodiments of the present disclosure are not limited to calls, but can be employed for any contact type (e.g., email, text, IM chat, call, video call, etc.), whether inbound or outbound.

In accordance with at least some embodiments of the present disclosure, a method of controlling an outbound dialer in a contact center is provided which generally comprises:

establishing a pool of idle agents in the contact center, wherein agents in the pool of idle agents are forced to remain idle for a predetermined amount of time even though the agents in the pool of idle agents are prepared to receive a contact;

moving a plurality of agents from the pool of idle agents to a pool of available agents after each of the plurality of agents have been idle for the predetermined amount of time;

determining that a first customer has answered a first outbound contact;

identifying a first of the plurality of agents in the pool of available agents as best-suited to handle the first outbound contact; and assigning the first of the plurality of agents to the first outbound contact.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
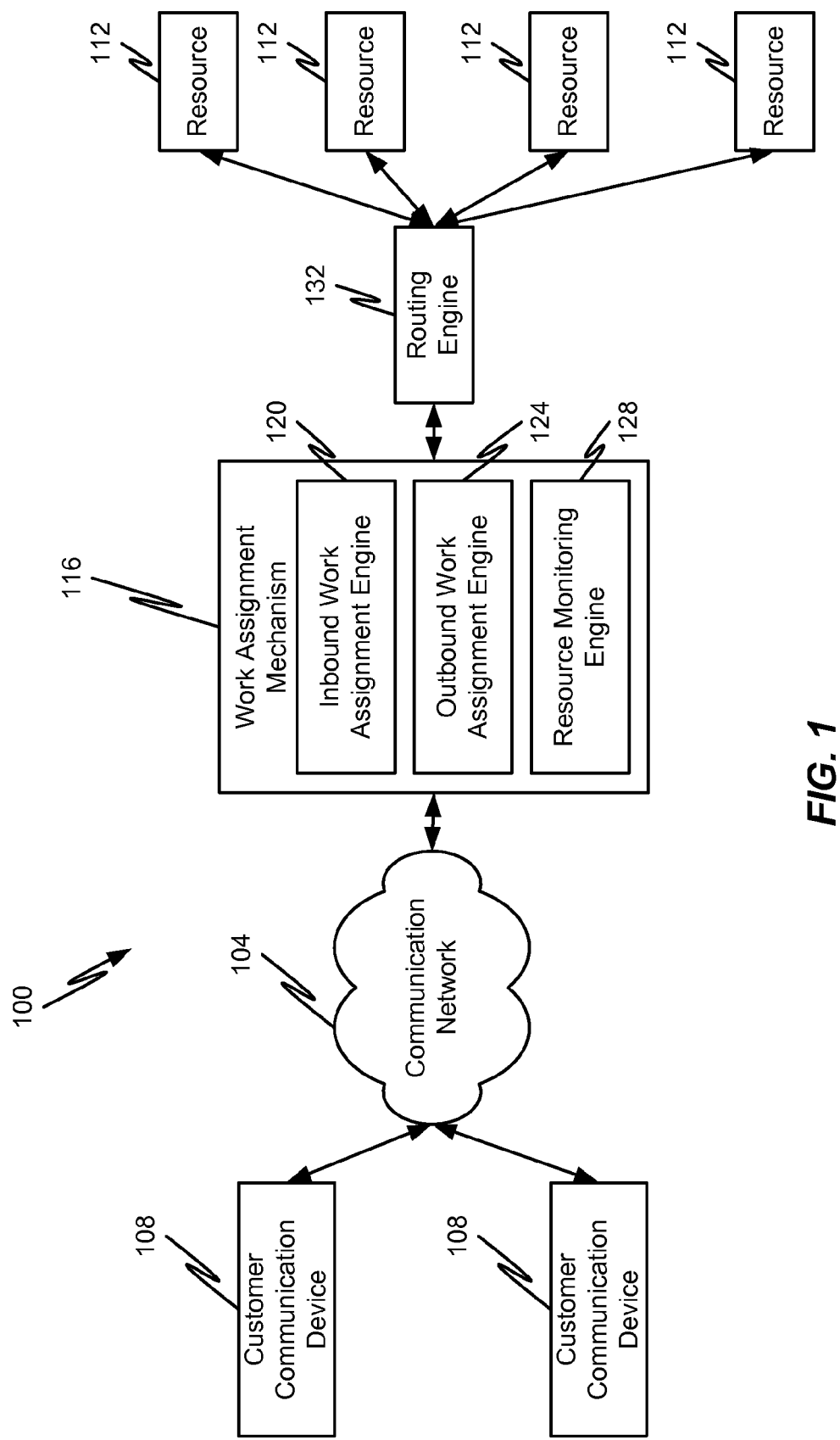
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises one or more communication networks 104. In some embodiments, the communication network 104 connects one or more customer communication devices 108 to a work assignment mechanism 116, which may be owned and operated by an enterprise administering a contact center in which a plurality of resources 112 are distributed.

The resources 112 may be capable of handling incoming work items (in the form of contacts) from the customer communication devices 108. Incoming work items are typically originated outside of the contact center, for example, by a customer operating the customer communication device 108. The resources 112 may also be capable of handling outgoing work items (also in the form of contacts). Outgoing work items, also referred to herein as outbound work items, are typically originated from within the contact center. One example of an outbound work item is a call placed by the contact center to a customer communication device 108. Some resources 112 may be only capable of handling one type of work item (e.g., either inbound or outbound) whereas other resources may be capable of handling both types of work items, sometimes simultaneously (e.g., an inbound non-real-time work item such as an email and an outbound real-time work item such as a call).

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser.

No. 12/469,523 to Steiner, the entire contents of which are hereby incorporated herein by reference. Moreover, the communication network 104 may comprise a number of different physical signal carriers such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112 and is often referred to as an inbound work item. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. Outbound work items may be similar or identical in nature to inbound work items except that they are originated by the contact center rather than the customer.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may further depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like, until a resource 112 is assigned to the work item representing that communication at which point the work assignment mechanism 116 passes the work item to a routing engine 132 to connect the communication device 108 which initiated (for inbound work items) or was the target of (for outbound work items) the communication with the assigned resource 112.

Although the routing engine 132 is depicted as being separate from the work assignment mechanism 116, the routing engine 132 may be incorporated into the work assignment mechanism 116 or its functionality may be executed by the various work assignment engines 120 and/or 124.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

In some embodiments, the work assignment mechanism 116 comprises an inbound work assignment engine 120 which enables the work assignment mechanism 116 to make intelligent routing decisions for work items originated by customers. The work assignment mechanism 116 may also comprise an outbound work assignment engine 124 which enables the work assignment mechanism 116 to originate contacts and when a customer answers the attempted contact to assign the outbound contact to a resource 112 as an outbound work item.

Although the inbound work assignment engine 120 is depicted as being separate and distinct from the outbound work assignment engine 124, it should be appreciated that the functionality of both engines can be integrated into a single work assignment engine. It should also be appreciated that certain capabilities discussed herein with respect to one work assignment engine can be incorporated into the other work assignment engine without departing from the scope of the present disclosure.

In some embodiments, the work assignment engines 120, 124 are configured to administer and make work assignment decisions in a queueless contact center, as is described in U.S. patent application Ser. No. 12/882,950, the entire contents of which are hereby incorporated herein by reference. The work assignment engines 120, 124 may also be configured to administer and make work assignment decisions in a traditional queue-based contact center where skill-based routing is used to assign work items to resources 112.

If a queueless contact center is implemented, the work assignment engine 120 and/or 124 can generate bitmaps/tables and determine, based on an analysis of the bitmaps/tables, which of the plurality of processing resources 112 is eligible and/or qualified to receive the work item and further determine which of the plurality of processing resources 112 is best suited to handle the processing needs of the work item. In situations of work item surplus, the work assignment engine 120 and/or 124 can also make the opposite determination (i.e., determine optimal assignment of a work item to a resource).

In some embodiments, the work assignment mechanism 116 may further include a resource monitoring engine 132. The resource monitoring engine 132 may be configured to analyze the activity of the contact center and determine one or more metrics that can be used to describe a current state of the contact center. The resource monitoring engine 132 may also analyze the various states of agents or resources 112 and provide such information to one or both of the work assignment engines 120, 124.

The work assignment engine(s) 120, 124 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

Figure 2:
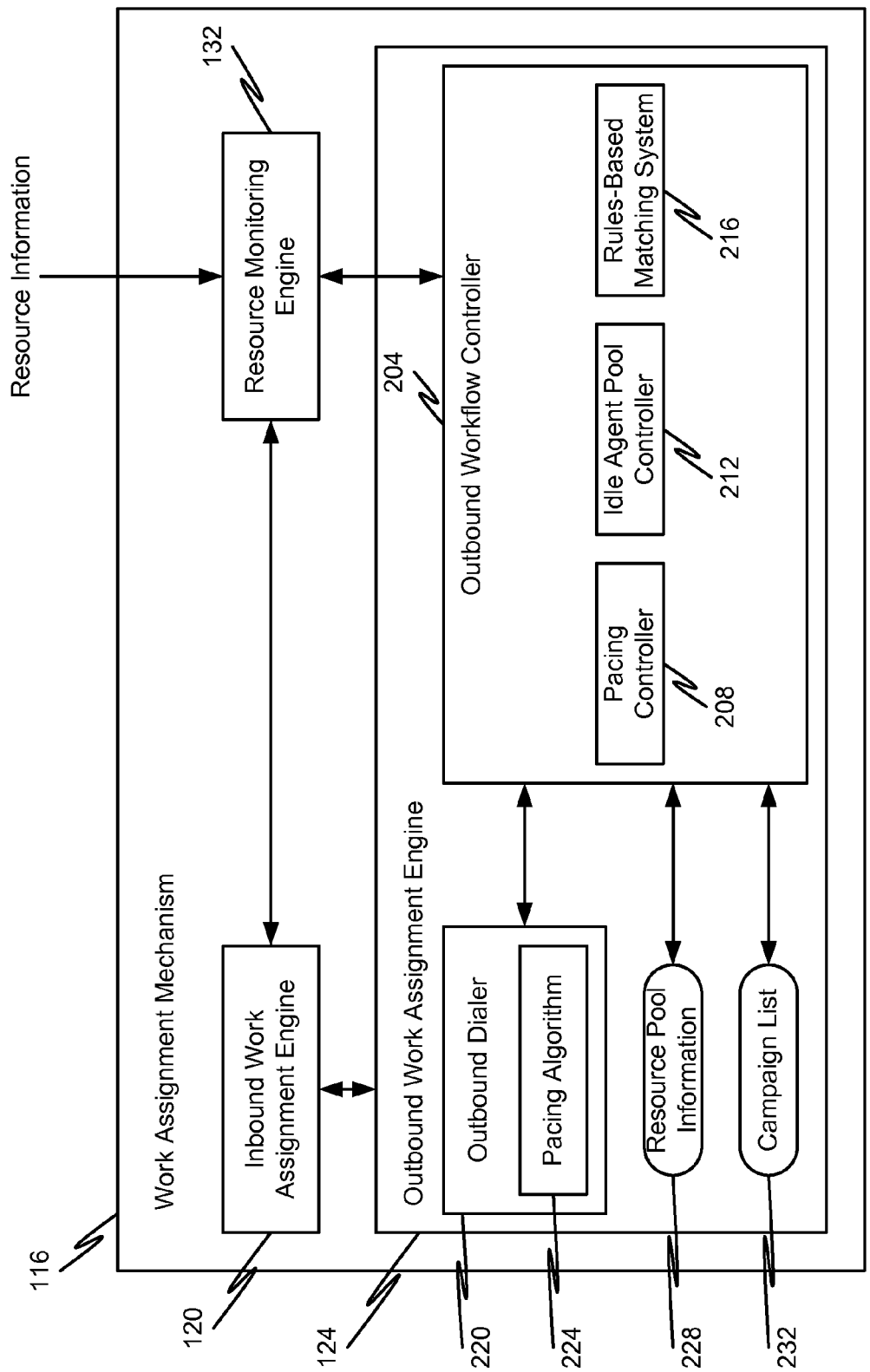
FIG. 2 is a block diagram depicting details of a work assignment mechanism in accordance with embodiments of the present disclosure.

With reference now to FIG. 2, additional details of the work assignment mechanism 116 will be described in accordance with embodiments of the present disclosure. Specifically, the outbound work assignment engine 124 may comprise an outbound dialer 220 that has a pacing algorithm 224 contained therein. The pacing algorithm 224 may be an operating parameter of the outbound dialer or it may be a function that is called or otherwise made available to the outbound dialer 220.

The outbound dialer 220, and specifically the pacing algorithm 224, may be controlled by an outbound workflow controller 204. The outbound workflow controller 204 may comprise one or more components that enable the outbound workflow controller 204 to analyze various types of information and based on such an analysis determine whether and to what extent the pacing algorithm 224 should be adjusted.

In some embodiments, the outbound workflow controller 204 comprises a pacing controller 208, an idle agent pool controller 212, and a rules-based matching system 216. The outbound workflow controller 204 may also be referred to as a tool for controlling the pacing algorithm 224 based on various inputs received from the resource monitoring engine 132 (e.g., based on the state of the contact center and/or statuses of various resources 112 in the contact center). In some embodiments, the outbound workflow controller 204 may have access to resource pool information 228 and a campaign list 232. These data sources may be built by and maintained within the outbound work assignment engine 124 or they may be built by other components in the contact center and made accessible to the outbound work assignment engine 124 as requested.

The idle agent pool controller 212, in some embodiments, may be configured to establish and control parameters of an idle agent pool. The idle agent pool may correspond to a collection or group of agents that would otherwise be available to process work items (either inbound or outbound), but have been precluded from doing so by virtue of the fact that they are in the idle agent pool. As discussed herein, the establishment of an idle agent pool may initially negatively impact the efficiency of the contact center and the agents therein. However, by forcing agents to be idle for a predetermined amount of time after they have completed service of a work item and before they are designated as available, it may be possible to obtain better matches between agents and work items, specifically outbound work items. If better matches are obtained for work items, then the work items may be processed more efficiently than if the better matches were not obtained and these efficiency gains are likely, and in many cases do, outweigh the losses incurred by forcing agents to be idle for a short amount of time.

The rules-based matching system 216 may work to select certain agents from a pool of idle or available agents for assigning to work items (e.g., outbound work items). In some embodiments, the rules-based matching system may be provided to select a best agent from among agents at are idle and/or available for handling a contact. The rules-based matching system may incorporate similar matching rules to those possessed by the inbound work assignment engine. In particular, the rules-based matching system 216 may first analyze all agents in the contact center to determine which among those agents are eligible to handle a certain work item or certain type of work item. Thereafter, the rules-based matching system 216 may determine which among the eligible agents is best suited to handle the certain work item or certain type of work item. The determinations made by the rules-based matching system 216 can be used to assign agents to work items and control the distribution of outbound work items among the various resources 112.

As noted above, the pacing controller 208 may receive multiple inputs from multiple sources and may use such inputs to speed up, slow down, or otherwise adjust the behavior of the pacing algorithm 224. In some embodiments, the pacing controller 208 may speed up or slow down the pacing algorithm 224 to accommodate either a growing or shrinking pool of idle agents.

The campaign list 232 may comprise an ordered list of numbers that are to be dialed by the outbound dialer 220 according to the order in which they are listed (e.g., first number is to-be dialed first, second number is to-be dialed second, etc.). Alternatively, the campaign list 232 may comprise an unordered pool of work items. In some embodiments, the pacing controller 208 may also be configured to re-order the campaign list 232, especially if instructed to do so by the rules-based matching system 216. Alternatively, or in addition, the pacing controller 208 may instruct the pacing algorithm 224 to re-order the campaign list 232 or select certain numbers from the campaign list 232 so as to maximize the efficiency of the contact center. As a non-limiting example, the well-matched analyzer 216 may determine that an agent or multiple agents are currently available to handle outbound calls of a certain type with a certain degree of efficiency (e.g., based on one or more skills or attributes of the agent(s)). The well-matched analyzer 216 may instruct the pacing controller 208 that a well-matched condition exists and that the pacing algorithm 224 should be adjusted to capitalize on the well-matched condition. Accordingly, the pacing controller 208 may instruct the pacing algorithm 224 to select certain numbers from the campaign list 232 that have skill requirements or known attributes that match the skills or attributes of the available or soon-to-be-available agents (e.g., agents within the pool of idle agents).

Figure 3:
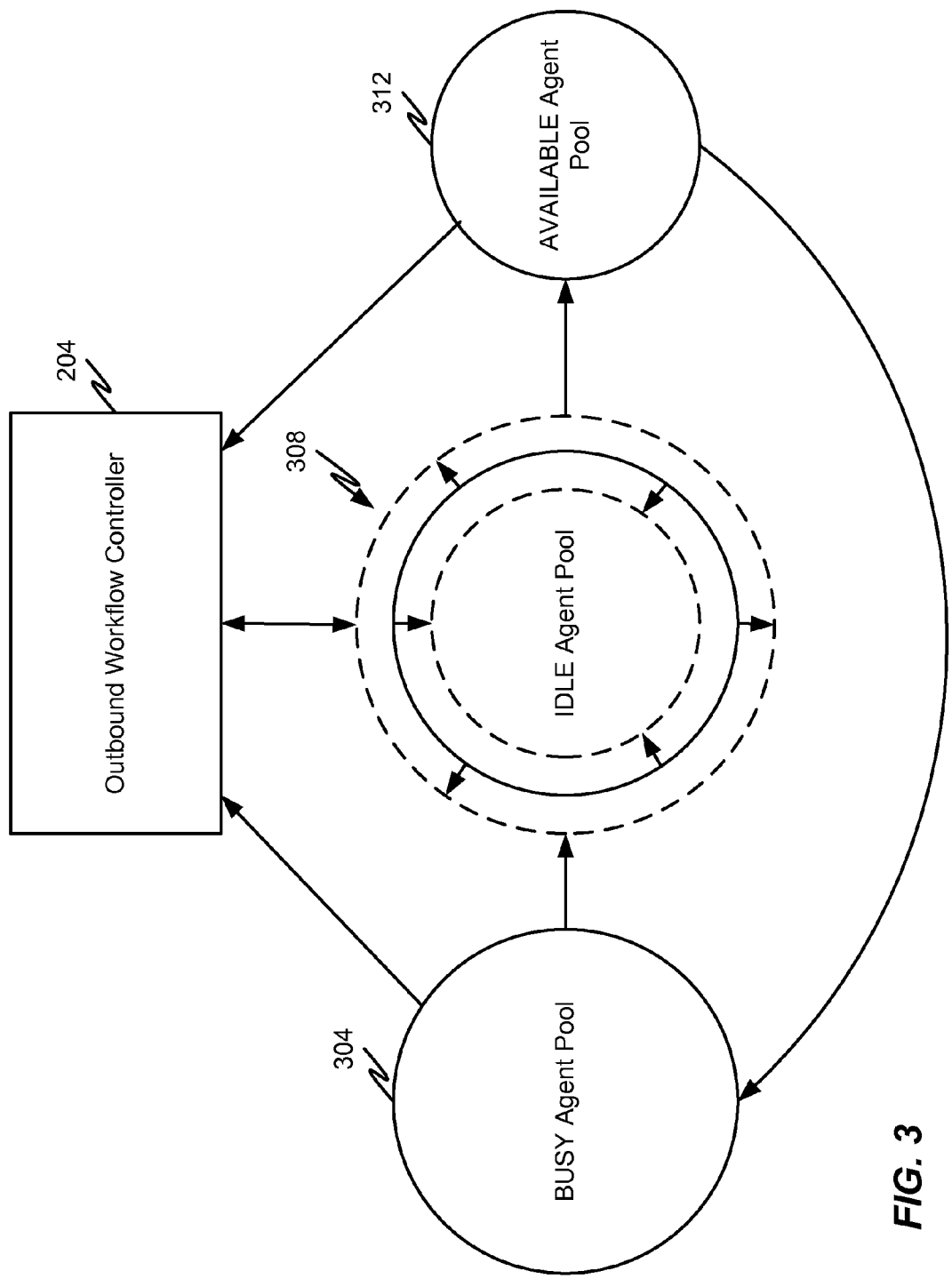
FIG. 3 is a block diagram depicting a data structure used in accordance with embodiments of the present disclosure.

FIG. 3 depicts a schematic representation of a resource pool and the way in which the outbound workflow controller 204 interacts with the resource pool to increase the effectiveness and efficiency associated with administering an outbound call campaign list 232. In some embodiments, a resource pool comprises and accounts for every resource 112 (e.g., agent) in the contact center, regardless of state, availability, etc. Each resource 112 or agent in the contact center may have certain attributes which define their current state (e.g., whether AVAILABLE, IDLE, BUSY, After Call Work (ACW), etc.). Depending upon an agent's state, the agent may be considered to be within a certain pool or subset of agents. In some embodiments, subsets of agents in the resource pool may include those agents who are currently BUSY or performing ACW (e.g., are part of the BUSY agent pool 304), those agents who have completed work, but are forced to be idle for a predetermined amount of time (e.g., are part of the IDLE agent pool 308), and those agents who are currently available to receive work (e.g., are part of the AVAILABLE agent pool 312).

As can be seen in FIG. 3, the outbound workflow controller 204 may be capable of receiving information about each of the pools 304, 308, 312. This information may be obtained from the resource monitoring engine 132, the resource pool information 228, or any other information source (e.g., directly from the agents themselves).

Moreover, the outbound workflow controller 204 and specifically the idle agent pool controller 212 may be configured to adjust one or more parameters of the IDLE agent pool 308. In some embodiments, the size of the IDLE agent pool 308 can be adjusted by controlling the maximum number of agents that are allowed to be in the IDLE agent pool at any given instance of time. In some embodiments, the IDLE agent pool 308 can be adjusted by controlling the minimum and/or maximum amount of time which an agent is required to be idle and, therefore, in the IDLE agent pool 308, prior to becoming available and, therefore, in the AVAILABLE agent pool 312. In some embodiments, the IDLE agent pool 308 can be adjusted by controlling the number of agents which are simultaneously transitioned from the IDLE agent pool 308 to the AVAILABLE agent pool 312. Combinations of the above-mentioned control schemes and other possible ways of controlling the size and distribution of agents in the IDLE agent pool 308 are also within the scope of the present disclosure.

Figure 4:
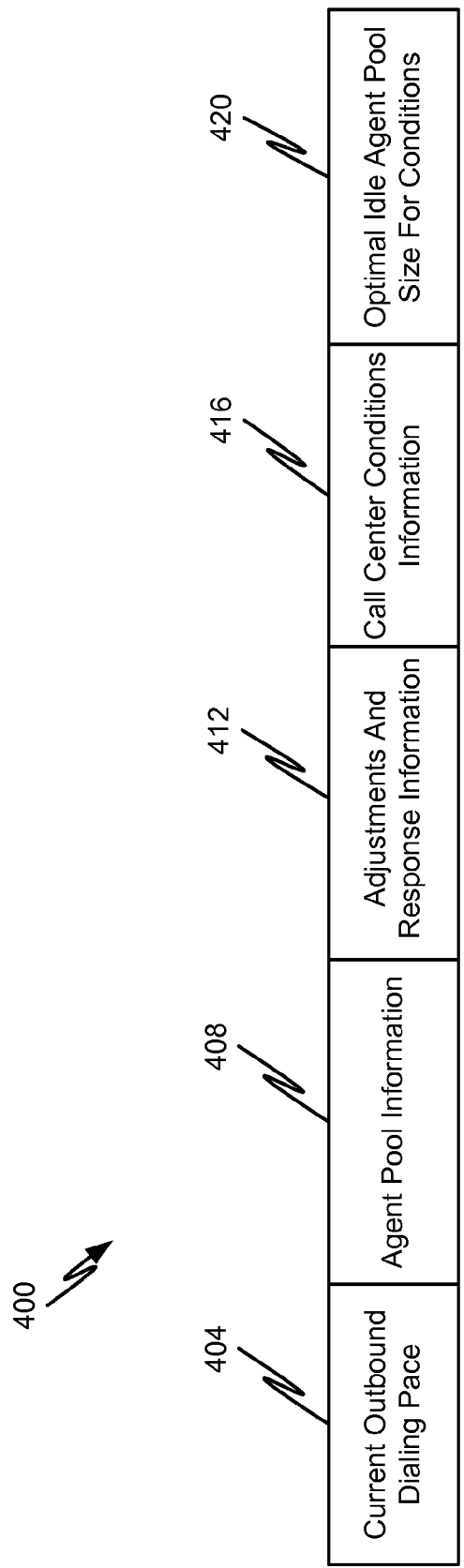
FIG. 4 is a flow diagram depicting a method of controlling an outbound dialer in a contact center in accordance with embodiments of the present disclosure.

FIG. 4 depicts one example of a data structure 400 which may be generated and used by the various components of the work assignment mechanism 116. In particular, a contact center may use the data structure 400 or multiple similar data structures to help determine how and when to adjust the parameters of the IDLE agent pool 308. In particular, the idle agent pool controller 212 may maintain or at least employ parts of the data structure 400.

The information fields that may be contained in the data structure 400 include, for example, a current outbound dialing pace field 404, an agent pool information field 408, an adjustment and response information field 412, a call center conditions information field 416, and an optimal idle agent pool for conditions information field 4204.

The current outbound dialing pace 404 may comprise information describing the rate at which the outbound dialer 220 is current dialing outbound calls. The dialing pace may be described in total outbound call attempts per minute (or any other measure of time). Alternatively, or in addition, the dialing pace may be described on a per-skill basis. Thus, each type of outbound contact may have its own dedicated data structure 400 or at least a different row (or column) within a common data structure.

The agent pool information field 408 may comprise information that describes the entirety of the resource pool or its constituent parts (e.g., describes the BUSY agent pool 304, IDLE agent pool 308, and AVAILABLE agent pool 312). In some embodiments, the agent pool information 408 may also describe which agent is in which pool. Alternatively, the agent pool information field 408 may be populated with attribute information or bitmaps describing the attributes of the agents in the contact center or the agents in a particular agent pool. The agent pool information field 408 may also include information that describes the skills or contact-handling capabilities of each agent or certain subsets thereof.

The adjustments and response information field 412 may comprise information that is used to optimize the parameters/size of the IDLE agent pool 308 and the historical information related to the way in which the IDLE agent pool 308 has been adjusted and whether such adjustments resulted in net gains or losses in efficiency for the contact center. In some embodiments, the adjustments and response information field 412 may comprise data that helps the development of a genetic pacing algorithm 224. In particular, certain random or semi-random variations to the size of the IDLE agent pool 308 may be enforced from time-to-time. These variations may result in the efficiency of the contact center either improving, worsening, or staying the same. The response to each variation and the characteristics of the variation (e.g., how the IDLE agent pool 308 was altered) along with other contextual information (e.g., contact center state at the time of the variation) may be maintained in the adjustments and response information field 412.

The call center conditions information field 416 may comprise current or recent information about the state of the contact center 416 (e.g., whether certain service level goals are being met or not). Furthermore, the call center conditions information field 416 may also contain information which describes how agents are distributed among the various pools 304, 308, 312 and whether that distribution is an efficient or inefficient distribution.

The optimal idle agent pool size for conditions information field 420 may comprise information which maps certain contact center states to an optimal or best-known IDLE agent pool 308 size. In particular, based on the historical responses to variations in the IDLE agent pool 308, the idle agent pool controller 212 is capable of determining what IDLE agent pool 308 size is the best for current contact center conditions. If no best known size is currently known for a certain contact center state, then that contact center state may be mapped to a default IDLE agent pool 308 size.

Figure 5:
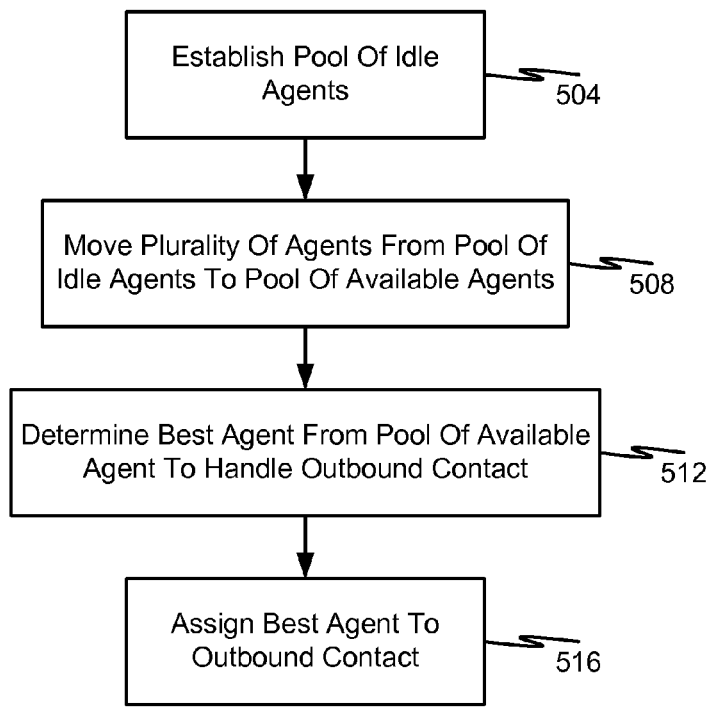
FIG. 5 is a flow chart depicting a first operational embodiment of the contact center in accordance with one embodiment of the present invention.

With reference now to FIG. 5, a method of controlling and dynamically adjusting the IDLE agent pool 308 will be described in accordance with embodiments of the present disclosure. The method begins with the establishment of the IDLE agent pool 308 (step 504). Establishment of the IDLE agent pool 308 may involve defining a minimum and/or maximum amount of time which an agent is or group of agents are required to be IDLE before becoming AVAILABLE and entering the AVAILABLE agent pool 312. This value may be administratively-provisioned or it may be a default setting.

One purpose of establishing the IDLE agent pool 308 is that it becomes possible to create better matches between agents and work items (e.g., outbound work items), once agents finally move into the AVAILABLE agent pool 312. These efficiencies are realized especially when there is more than one agent that is eligible and considered for outbound work items. In other words, establishment of the IDLE agent pool 308 enables the outbound workflow controller 204 to stage multiple agents before they become AVAILABLE, rather than simply assigning an outbound work item to the next agent that becomes AVAILABLE or that has been waiting the longest in the AVAILABLE agent pool 312.

In some embodiments, the method continues with a plurality of agents moving from the IDLE agent pool 308 to the AVAILABLE agent pool 312 (step 508). In some embodiments, this movement may occur by virtue of the fact that multiple agents have waited in the IDLE agent pool 308 for the prescribed minimum amount of time. In some embodiments, this movement may occur under the control of the outbound workflow controller 204. Furthermore, the plurality of agents may move from one pool to the next at substantially the same time. Alternatively, multiple agents may move from the IDLE agent pool 308 to the AVAILABLE agent pool 312 between periods in which outbound work items are assigned (e.g., a first outbound work item is assigned, then multiple agents move from the IDLE agent pool 308 to the AVAILABLE agent pool 312, then a second outbound work item is assigned).

Thereafter, the rules-based matching system 216 analyzes every agent in the AVAILABLE agent pool 312 to identify the best agent for handling the next successful outbound work item (step 512). The selection of the best agent may be based on attributes of the agents, processing requirements of the outbound work item (e.g., language requirements, customer importance, etc.), and other considerations traditionally used in routing inbound work items among agents. After the outbound workflow controller 204 has identified by best agent for the outbound work item, the method continues with the best agent being assigned the outbound work item or contact (step 516). In particular, results of the assignment decision may be sent to the routing engine 132, which connects the customer associated with the outbound work item and the selected agent.

Figure 6:
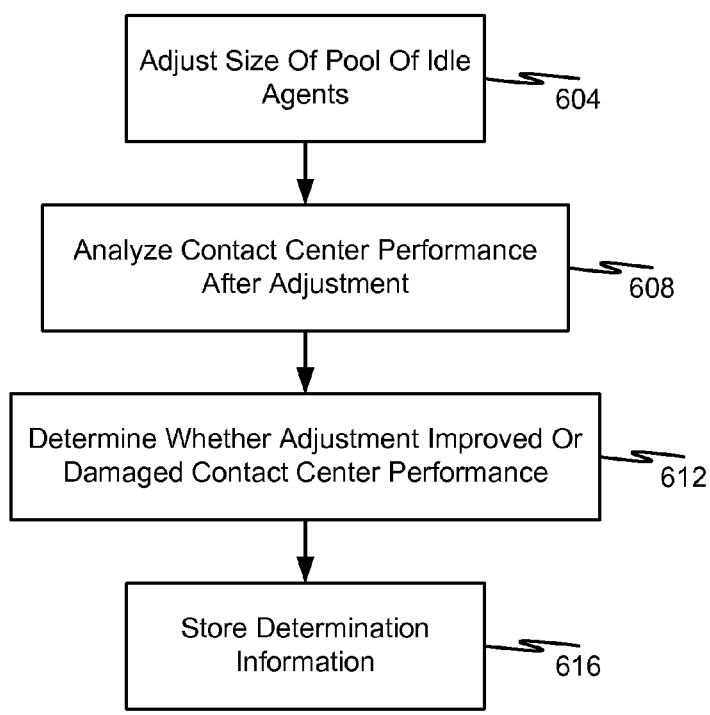
FIG. 6 is a flow chart depicting a second operational embodiment of the contact center in accordance with one embodiment of the present invention.

With reference now to FIG. 6, a method of facilitating a genetic pacing algorithm 224 will be described in accordance with embodiments of the present disclosure. The method begins with the idle agent pool controller 212 adjusting one or more parameters of the IDLE agent pool 308 (step 604). In some embodiments, the size of the IDLE agent pool 308 may be adjusted by changing the minimum and/or maximum amount of time that an agent is allowed to stay in the IDLE agent pool 308. In some embodiments, the size of the IDLE agent pool 308 may be adjusted by changing the number of agents that are allowed or required to simultaneously transition from the IDLE agent pool 308 to the AVAILABLE agent pool 312.

After the change has been made, the method continues with the resource monitoring engine 132 analyzing the overall performance of the contact center (step 608). If any changes are detected in the overall performance (e.g., as measured by one or more KPIs, efficiency measures, or other metrics) of the contact center, then those changes may at least be associated with the adjustment in the IDLE agent pool 308.

Based on the analysis of the contact center performance, the determination is made whether the adjustment of the IDLE agent pool 308 resulted in an improvement or detriment in the contact center performance (step 612). This determination and any other pertinent analysis information (e.g., information related to the contact center state at the time of the adjustment and details of the way in which the IDLE agent pool 308 was adjusted) may then be stored in the data structure 400 or any other suitable location (step 616).

Figure 7:
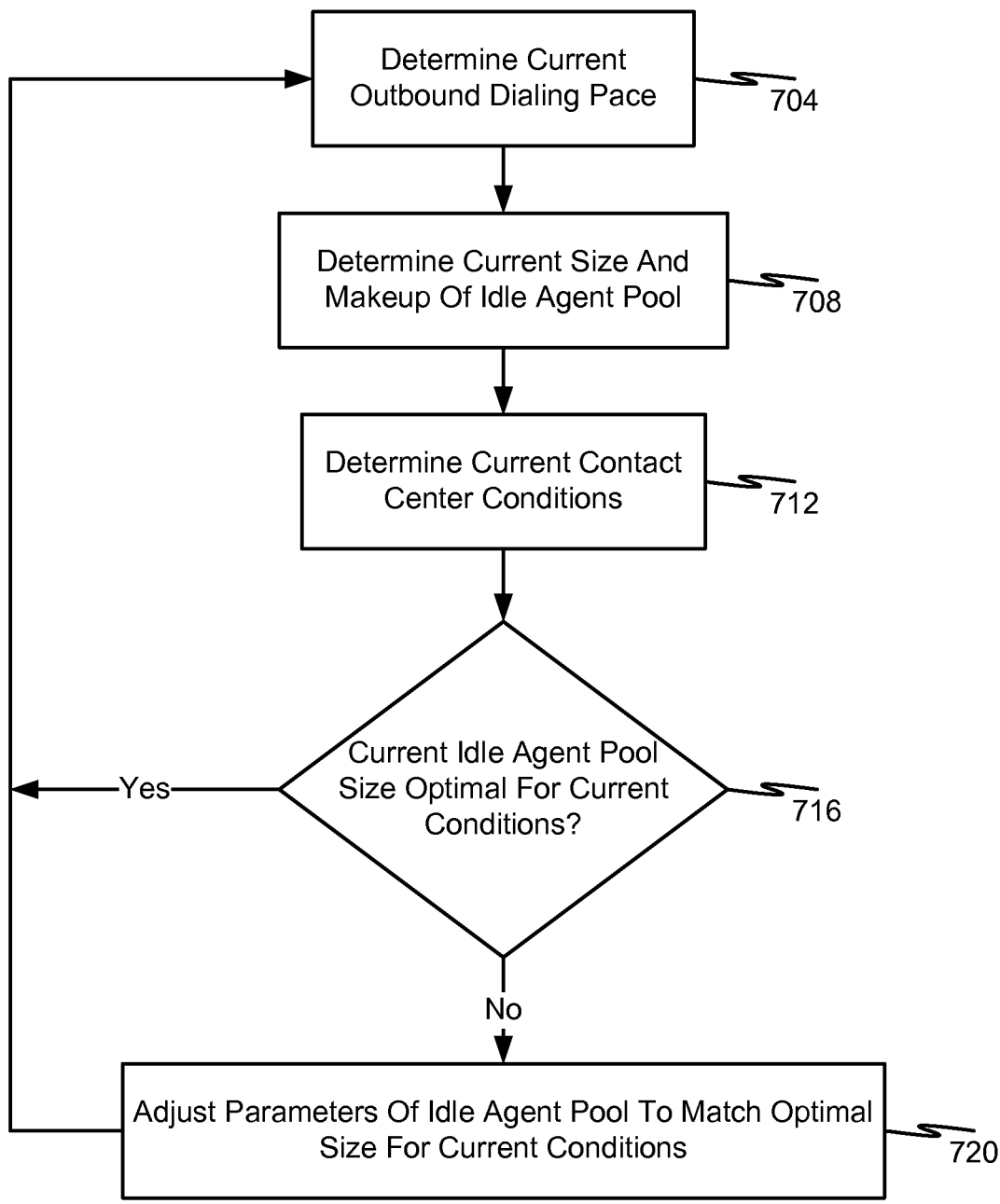
FIG. 7 is a flow chart depicting a third operational embodiment of the contact center in accordance with one embodiment of the present invention.

With reference now to FIG. 7, a method of adjusting an IDLE agent pool 308 in response to detecting certain contact center conditions will be described in accordance with embodiments of the present disclosure. The method is initiated by determining a current outbound dialing pace (step 704). The pace may be described in terms of number of outbound call attempts per unit time or number of successful outbound calls per unit time. This information may be determined directly from the outbound dialer 220 or it may be inferred by analyzing the behavior of the outbound work assignment engine 124.

The method continues by determining a current size and makeup of the IDLE agent pool 308 (step 708) as well as the current contact center conditions (step 712). The size of the IDLE agent pool 308 may be described as the average number of agents in the IDLE agent pool 308 at any given time or over a certain amount of time. The makeup of the IDLE agent pool 308 may include any parameter other than size that describes the IDLE agent pool 308, such as the call-handling capabilities or attributes of the agents in the IDLE agent pool 308, how long one or more agents have been in the IDLE agent pool 308, how long until one or more agents are eligible to move from the IDLE agent pool 308 to the AVAILABLE agent pool 312, etc. As noted above, the contact center conditions may be described in a variety of ways, such as by one or more KPI metrics, analyzing contact center traffic, and the like.

The method continues with the idle agent pool controller determining whether the current size of the IDLE agent pool 308 is optimal for the current contact center conditions (step 716). If the query is answered affirmatively, then the method returns to step 704. Otherwise, the idle agent pool controller 212 will adjust one or more parameters of the IDLE agent pool 308 to optimize the pool according to current contact center conditions (step 720). The information referenced by the idle agent pool controller 212 in this step may correspond to the information that was stored in step 616.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of controlling an outbound dialer in a contact center, comprising:
   establishing a pool of idle agents in the contact center;
   forcing agents in the pool of idle agents in the contact center to remain idle for a predetermined amount of time even though the agents in the pool of idle agents are prepared to receive a contact;
   moving a plurality of agents from the pool of idle agents to a pool of available agents after each of the plurality of agents have been idle for the predetermined amount of time;
   determining that a first contact from first customer is ready to be assigned to an agent;
   identifying a first of the plurality of agents in the pool of available agents as best-suited to handle the first contact, wherein the first of the plurality of agents in the pool of available agents is identified as best-suited based on a comparison of a first agent's call-processing attributes and a first customer's processing requirements;
   assigning the first of the plurality of agents to the first contact;
   adjusting the size of the pool of idle agents;
   analyzing a performance metric of the contact center after the size of the pool of idle agents has been adjusted;
   comparing the analyzed performance metric to a value of the performance metric before the size of the pool of idle agents has been adjusted; and
   correlating a change in the performance metric to the adjustment of the size of the pool of idle agents, and wherein the correlation between the change in the performance metric and the adjustment of the size of the pool of idle agents is used to determine a preferred size of the pool of idle agents for a contact center condition.

2. The method of claim 1, wherein the correlation between the change in the performance metric and the adjustment of the size of the pool of idle agents is used to determine a preferred size of the pool of idle agents for a contact center condition.

3. The method of claim 1, further comprising:
   determining a current condition of the contact center;
   mapping the current condition of the contact center to a first size of the pool of idle agents; and
   adjusting the size of the pool of idle agents to substantially correspond to the first size of the pool of idle agents.

4. The method of claim 3, wherein the first contact is a first outbound contact attempt and wherein adjusting the size of the pool of idle agents comprises changing the predetermined amount of time.

5. The method of claim 3, wherein the current condition of the contact center is determined by one or more Key Performance Indicator metrics for the contact center.

6. The method of claim 1, wherein the plurality of agents are moved from the pool of idle agents to the pool of available agents at substantially the same time and before performing the identifying and assigning steps.

7. The method of claim 1 further comprising:
   adjusting the predetermined amount of time by random amounts at regular intervals, wherein the predetermined amount of time leads to increases or decreases in the number of well-matched agents corresponding to the first customer's processing requirements.

8. The method of claim 7, wherein an average of the predetermined amount of time is less than an average of all corresponding call handling times.

9. A non-transitory computer readable medium having stored thereon instructions that cause a computing system to execute a method of controlling an outbound dialer in a contact center, the instructions comprising:
   instructions configured to manage a pool of idle agents in the contact center, wherein agents in the pool of idle agents are forced to remain idle for a predetermined amount of time even though the agents in the pool of idle agents are otherwise prepared to receive a contact;
   instructions configured to move a plurality of agents from the pool of idle agents to a pool of available agents after each of the plurality of agents have been idle for the predetermined amount of time;
   instructions configured to determine that first contact from a first customer is ready to be assigned to an agent;
   instructions configured to identify a first of the plurality of agents in the pool of available agents as best-suited to handle the first contact, wherein the first of the plurality of agents in the pool of available agents is identified as best-suited based on a comparison of the first agent's call-processing attributes and the first customer's processing requirements;
   instructions configured to assign the first of the plurality of agents to the first contact;
   instructions configured to adjust the size of the pool of idle agents;
   instructions configured to analyze a performance metric of the contact center after the size of the pool of idle agents has been adjusted;
   instructions configured to compare the analyzed performance metric to a value of the performance metric before the size of the pool of idle agents has been adjusted; and
   instructions configured to correlate a change in the performance metric to the adjustment of the size of the pool of idle agents.

10. The computer readable medium of claim 9, wherein the correlation between the change in the performance metric and the adjustment of the size of the pool of idle agents is used to determine a preferred size of the pool of idle agents for a contact center condition.

11. The computer readable medium of claim 9, wherein the instructions further comprise:
    instructions configured to determine a current condition of the contact center;
    instructions configured to map the current condition of the contact center to a first size of the pool of idle agents; and
    instructions configured to adjust the size of the pool of idle agents to substantially correspond to the first size of the pool of idle agents.

12. The computer readable medium of claim 11, wherein the first contact is a first outbound contact attempt and wherein adjusting the size of the pool of idle agents comprises changing the predetermined amount of time.

13. The computer readable medium of claim 11, wherein the current condition of the contact center is determined by one or more Key Performance Indicator metrics for the contact center.

14. The computer readable medium of claim 9, wherein the instructions further comprise:

instructions configured to adjust the predetermined amount of time by random amounts at regular intervals, wherein the predetermined amount of time leads to increases or decreases in the number of well-matched agents corresponding to the first customer's processing requirements.

15. A contact center, comprising:

an outbound work assignment engine including:

an outbound dialer configured to dial calls from a campaign list according to rules contained in a pacing algorithm of the outbound dialer; and an outbound workflow controller configured to manage a pool of idle agents in the contact center, wherein agents in the pool of idle agents are forced to remain idle for a predetermined amount of time even though the agents in the pool of idle agents are otherwise prepared to receive a contact, move a plurality of agents from the pool of idle agents to a pool of available agents after each of the plurality of agents have been idle for the predetermined amount of time, determine that a first customer has answered a first outbound contact attempt, identify a first of the plurality of agents in the pool of available agents as best-suited to handle the successful first outbound contact attempt, wherein the first of the plurality of agents in the pool of available agents is identified as best-suited based on a comparison of the first agent's call-processing attributes and the first customer's processing requirements, assign the first of the plurality of agents to the first outbound contact, adjust the size of the pool of idle agents, analyze a performance metric of the contact center after the size of the pool of idle agents has been adjusted, compare the analyzed performance metric to a value of the performance metric before the size of the pool of idle agents has been adjusted; and correlate a change in the performance metric to the adjustment of the size of the pool of idle agents.

16. The contact center of claim 15, wherein the outbound workflow controller is further configured to determine a current condition of the contact center, map the current condition of the contact center to a first size of the pool of idle agents, and adjust the size of the pool of idle agents to substantially correspond to the first size of the pool of idle agents.

17. The contact center of claim 16, wherein adjusting the size of the pool of idle agents comprises changing the predetermined amount of time.

18. The contact center of claim 16, wherein the current condition of the contact center is determined by one or more Key Performance Indicator metrics for the contact center.

19. The contact center of claim 15, wherein the predetermined amount of time is adjusted by random amounts at regular intervals, and wherein the predetermined amount of time leads to increases or decreases in the number of well-matched agents corresponding to the first customer's processing requirements.

20. The contact center of claim 19, wherein an average of the predetermined amount of time is less than an average of all corresponding call handling times.

21. A contact center, comprising:
a pool of idle agents;
a pool of available agents; and
a work assignment engine configured to perform operations including:

establish the pool of idle agents;

force agents in the pool of idle agents to remain idle for a predetermined amount of time even though the agents in the pool of idle agents are prepared to receive a contact;

move a plurality of agents from the pool of idle agents to the pool of available agents after each of the plurality of agents have been idle for the predetermined amount of time;

determine that a first contact from first customer is ready to be assigned to an agent;

identify a first of the plurality of agents in the pool of available agents as best-suited to handle the first contact, wherein the first of the plurality of agents in the pool of available agents is identified as best-suited based on a comparison of a first agent's call-processing attributes and a first customer's processing requirements;

assign the first of the plurality of agents to the first contact;

adjust the size of the pool of idle agents;

analyze a performance metric of the contact center after the size of the pool of idle agents has been adjusted;

compare the analyzed performance metric to a value of the performance metric before the size of the pool of idle agents has been adjusted; and correlate a change in the performance metric to the adjustment of the size of the pool of idle agents, wherein the correlation between the change in the performance metric and the adjustment of the size of the pool of idle agents is used to determine a preferred size of the pool of idle agents for a contact center condition.

22. The contact center of claim 21, wherein the work assignment engine is further configured to determine a current condition of the contact center, map the current condition of the contact center to a first size of the pool of idle agents, and adjust the size of the pool of idle agents to substantially correspond to the first size of the pool of idle agents.

23. The contact center of claim 22, wherein adjusting the size of the pool of idle agents comprises changing the predetermined amount of time.

24. The contact center of claim 22, wherein the current condition of the contact center is determined by one or more Key Performance Indicator metrics for the contact center.

25. The contact center of claim 21, wherein the predetermined amount of time is adjusted by random amounts at regular intervals and wherein the predetermined amount of time leads to increases or decreases in the number of well-matched agents corresponding to the first customer's processing requirements.

26. The contact center of claim 25, wherein an average of the predetermined amount of time is less than an average of all corresponding call handling times.

* * * * *